United States Patent
Wiles

(10) Patent No.: US 11,505,080 B2
(45) Date of Patent: Nov. 22, 2022

(54) CONTROLLING TRANSFER OF DATA

(71) Applicant: JAGUAR LAND ROVER LIMITED, Coventry (GB)

(72) Inventor: Paul Wiles, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 100 days.

(21) Appl. No.: 16/461,604

(22) PCT Filed: Dec. 6, 2017

(86) PCT No.: PCT/EP2017/081739
§ 371 (c)(1),
(2) Date: May 16, 2019

(87) PCT Pub. No.: WO2018/133987
PCT Pub. Date: Jul. 26, 2018

(65) Prior Publication Data
US 2019/0344681 A1 Nov. 14, 2019

(30) Foreign Application Priority Data
Jan. 18, 2017 (GB) .................................... 1700840

(51) Int. Cl.
*B60L 53/66* (2019.01)
*B60L 53/62* (2019.01)
*B60L 53/68* (2019.01)

(52) U.S. Cl.
CPC ............... *B60L 53/66* (2019.02); *B60L 53/62* (2019.02); *B60L 53/68* (2019.02)

(58) Field of Classification Search
CPC .......... B60L 53/66; B60L 53/68; B60L 53/62; B60L 53/50; B60L 53/52; B60L 53/54;
(Continued)

(56) References Cited

U.S. PATENT DOCUMENTS

2007/0025367 A1* 2/2007 Wijnands ............. G06F 1/1632
370/401
2013/0166136 A1 6/2013 Park
2017/0090535 A1* 3/2017 Jeyapaul ................ G06F 1/329

FOREIGN PATENT DOCUMENTS

JP 2009105605 A * 5/2009
JP 2009105605 A 5/2009

OTHER PUBLICATIONS

Machine translation of JP-2009105605-A. (Year: 2021).*
(Continued)

*Primary Examiner* — David V Henze-Gongola
(74) *Attorney, Agent, or Firm* — McCoy Russell LLP

(57) ABSTRACT

An apparatus (101) for controlling transfer of data to and/or from a vehicle (201), along with a system, a vehicle, a method, a computer program and a non-transitory computer readable medium are disclosed. The apparatus (101) comprises a control means (102) configured to: determine a state of charge of the energy storage means (203) that is required at the end of a period in which charging of the energy storage means (203) by an external charging means (225) is performable; predict a state of charge of the energy storage means (203) at the end of the period if a transfer of data were to be performed; and enable the transfer of data to be performed during the period in dependence on the predicted state of charge of the energy storage means (203) at the end of the period being greater than or equal to the state of charge required at the end of the period.

20 Claims, 7 Drawing Sheets

(58) Field of Classification Search
CPC .. B60L 53/58; B60L 58/14; B60L 3/00; B60L 3/0046; H04W 52/0261; H04M 1/73; Y02T 90/16; Y02T 90/167
See application file for complete search history.

(56) References Cited

OTHER PUBLICATIONS

International Search Report and Written Opinion, PCT/EP2017/081739, dated Mar. 26, 2018.
Search and Examination Report, GB1700840.0, dated Jun. 28, 2017.

\* cited by examiner

CONTROLLING TRANSFER OF DATA

CROSS-REFERENCE TO RELATED APPLICATIONS

This application is a 371 of International Application No. PCT/EP2017/081739, filed Dec. 6, 2017, which claims priority to GB Patent Application 1700840.0, filed Jan. 18, 2017, the contents of both of which are incorporated by reference herein in their entirety.

TECHNICAL FIELD

The present disclosure relates to an apparatus, a system, a vehicle, a method, a computer program or a non-transitory computer readable medium for controlling transfer of data. In particular, but not exclusively it relates to an apparatus, a system, a vehicle, a method, a computer program or a non-transitory computer readable medium for controlling a transfer of data to and/or from a vehicle, such as a road vehicle.

Aspects of the invention relate to an apparatus, a system, a vehicle, a method, a computer program and a non-transitory computer readable medium.

BACKGROUND

It is possible for a person to carry to a vehicle, a storage device containing entertainment or infotainment media (such as music, videos and so on), which may then be transferred to an infotainment system on the vehicle. However, this can be inconvenient, requiring a degree of effort and organization by the person who is making the transfer, and it is also time consuming. It is also known to have one or more systems within vehicles that are capable of downloading data via a cellular telecommunications network. However, when large amounts of data are required to be downloaded, this may be slow and relatively expensive. In addition, it requires a relevant system of the vehicle to be awake during the download and this can deplete charge stored within an energy storage means of the vehicle.

It is an aim of the present invention to address the disadvantages of the prior art.

SUMMARY OF THE INVENTION

Aspects and embodiments of the invention provide an apparatus, a system, a vehicle, a method, a computer program and a non-transitory computer readable medium as claimed in the appended claims.

According to an aspect of the invention there is provided an apparatus for controlling transfer of data to and/or from a vehicle, the apparatus comprising a control means configured to: determine a state of charge of an energy storage means of the vehicle that is required at the end of a period in which charging of the energy storage means by an external charging means is performable; predict a state of charge of the energy storage means at the end of the period if a transfer of data were to be performed; and enable the transfer of data to be performed during the period in dependence on the predicted state of charge of the energy storage means at the end of the period being greater than or equal to the state of charge required at the end of the period.

Arranging a transfer of data while the vehicle is not being used to travel provides the advantage that the transfer of data may be performed over a local network, such as a WLAN or LAN, which provides relatively fast communication and at relatively little cost when compared to transfer of the same data over a cellular telecommunications network. Also, by determining a prediction of state of charge of the energy storage means at the end of the period if the transfer of data were to be performed, relatively large quantities of data may be transferred without jeopardizing the ability of the vehicle to provide the necessary range to complete its next journey.

In some embodiments the control means is configured to: determine an estimate of charge required to perform a transfer of data; and predict the state of charge at the end of the period in dependence on the estimate of charge required to perform a transfer of data.

This provides the advantage that the predicted state of charge may be more accurate.

In some embodiments, the control means is configured to enable a transfer of a portion of data awaiting transfer in dependence on a predicted state of charge of the energy storage means at the end of the period, if a transfer of all of the data awaiting transfer were performed, being less than the determined state of charge required at the end of the period.

This provides the advantage that at least a portion of the data awaiting transfer may be transferred without jeopardizing the ability of the vehicle to provide the necessary range to complete its next journey.

In some embodiments, the control means is configured to: control transfer of data that comprises a plurality of sets of data, an estimated charge being associated with each said set for transferring the data of that set; and cause the required transfer of data to be performed by causing one or more of the sets to be transferred in dependence on the estimated charge required to transfer the data of the one or more sets.

This provides the advantage that the quantity of data that is transferred may be optimized in consideration of the charge required to transfer the various sets of data.

In some embodiments the control means is configured to: control transfer of data comprising a plurality of sets of data, an estimated charge for transferring the data of a set being associated with each said set, and a priority rating being associated with each said set; and cause the required transfer of data to be performed by causing one or more of the sets to be transferred in dependence on the estimated charge required to transfer the data of the one or more sets and the priority rating of the one or more sets.

This provides the advantage that the data awaiting transfer that is most urgently requiring transfer may be transferred soonest.

In some embodiments the data comprises a media file and/or a software update file.

In some embodiments the control means is configured to determine a predicted duration of the period in which charging of an energy storage means of the vehicle by an external charging means is performable.

In some embodiments the control means is configured to obtain an estimated departure time of a next journey and determine the predicted duration in dependence on the estimated departure time.

This provides the advantage that the energy storage device may be sufficiently charged at a time when the next journey is predicted to begin.

In some embodiments the control means is configured to log departure times of the vehicle and determine the predicted duration in dependence on logged departure times.

This provides the advantage that the energy storage device may be sufficiently charged at a time when the next journey begins without manual input being required.

In some embodiments the control means is configured to obtain information from a calendar relating to a scheduled appointment and determine the predicted duration in dependence on the obtained information.

This provides the advantage that the energy storage device is more likely to be sufficiently charged at a time when a journey for an appointment begins.

In some embodiments the control means is configured to log distances of journeys made by the vehicle and determine the required state of charge by determining a predicted distance of a next journey in dependence on logged distances.

This provides the advantage that the energy storage device is likely to be sufficiently charged for the next journey while providing more time for data transfer than would be provided if the required state of charge were always fully charged.

In some embodiments the control means is configured to log departure times of journeys made by the vehicle; log a reduction in state of charge during said journeys; and determine the required state of charge in dependence on the logged departure times and the logged reduction in state of charge.

This provides the advantage that the energy storage device is likely to be sufficiently charged for the next journey while providing more time for data transfer than would be provided if the required state of charge were always fully charged.

In some embodiments the control means is configured to: determine a predicted reduction in state of charge for a predicted journey in dependence on logged reductions in state of charge during journeys made by the vehicle; and determine the required state of charge in dependence on the predicted reduction in state of charge.

This provides the advantage that the energy storage device is likely to be sufficiently charged for the next journey while providing more time for data transfer than would be provided if the required state of charge were always fully charged.

In some embodiments the control means is configured to: determine a delay period in dependence on the required state of charge; and postpone, by the delay period, the start of the required data transfer.

This provides the advantage that the required state of charge will be obtained sooner and therefore the likelihood of the energy storage device not being sufficiently charged when a next journey begins is relatively small.

In some embodiments the control means is configured to: receive a signal indicative of the state of charge of the energy storage means; and delay the start of a required data transfer until a received signal indicates that the state of charge of the energy storage means is greater than or equal to a threshold value.

This provides the advantage that the required state of charge is achieved relatively quickly and ensures that the required state of charge is achieved before the start of the data transfer, which may slow down the charging process.

In some embodiments the control means is configured to: determine a predicted reduction in the state of charge for a predicted journey and determine the threshold value in dependence on the predicted reduction in the state of charge.

This provides the advantage that the start of the data transfer may be delayed until the state of charge of the energy storage means is equal to the charge predicted to be required for a next journey plus an additional charge that allows for some error in the predicted charge.

In some embodiments the control means is configured to determine the estimated charge required to perform the transfer of data in dependence on the quantity of data to be transferred and/or a rate of data transfer. The rate of data transfer may be a predicted rate of data transfer determined in dependence on one or more previous rates of transfer and/or one or more parameters of the hardware to be used for the transfer.

In some embodiments the control means is configured to determine the estimated charge required to perform the transfer of data in dependence on a known power consumption of one or more electronic units required to be active during the transfer.

This provides the advantage that the estimated charge required to perform the transfer of data may be a more accurate estimate.

In some embodiments the control means comprises at least one electronic processor and at least one electronic memory device coupled to the electronic processor and having instructions stored therein.

In some embodiments the predicted state of charge of the energy storage means at the end of the period is dependent on an estimate of increase in charge by charging the energy storage means during the period.

This provides the advantage that an increased quantity of data may be transferred when the energy storage means is charged during the period in which charging by an external charging means is performable.

According to another aspect of the invention there is provided a system comprising the apparatus of any one of the previous paragraphs and a communication means for transmitting and/or receiving a signal comprising the data.

In some embodiments the communication means comprises a wireless transceiver.

According to yet another aspect of the invention there is provided a vehicle comprising the apparatus of any of the previous paragraphs or the system of one of the previous paragraphs.

According to further aspect of the invention there is provided a method of transferring data, the method comprising: determining a state of charge of an energy storage means of a vehicle that is required at the end of a period in which charging of the energy storage means by an external charging means is performable; predicting a state of charge of the energy storage means at the end of the period if a transfer of data were to be performed; and enabling the transfer of data to be performed during the period in dependence on the predicted state of charge of the energy storage means at the end of the period being greater than or equal to the state of charge required at the end of the period.

In some embodiments the method comprises determining an estimate of charge required to perform a transfer of data; and predicting the state of charge at the end of the period in dependence on the estimate of charge required to perform a transfer of data.

In some embodiments data required to be transferred comprises a plurality of sets of data, an estimated charge being associated with each said set for transferring the data of that set, and said enabling the required transfer of data to be performed comprises causing one or more of the sets to be transferred in dependence on the estimated charge required to transfer the data of the one or more sets.

In some embodiments data required to be transferred comprises a plurality of sets of data; an estimated charge is associated with each said set for transferring the data of that set; a priority rating is associated with each said; and said enabling the required transfer of data to be performed comprises causing one or more of the sets to be transferred in dependence on the estimated charge required to transfer the data of the one or more sets and the priority rating of the one or more sets.

In some embodiments the method comprises determining a predicted duration of the period in which charging of an energy storage means of the vehicle by an external charging means is performable; and the predicted state of charge of the energy storage means at the end of the period is dependent on an estimate of increase in charge by charging the energy storage means during the period.

In some embodiments the method comprises obtaining an estimated departure time of a next journey and determining the predicted duration in dependence on the estimated departure time.

In some embodiments the method comprises logging journey departure times of the vehicle and determining the predicted duration in dependence on logged journey departure times.

In some embodiments the method comprises logging departure times of the vehicle and logging a reduction in state of charge during journeys; and the required state of charge is dependent on logged times of departure and logged reductions in state of charge.

In some embodiments the method comprises: determining a predicted reduction in state of charge for a predicted journey in dependence on logged reductions in state of charge during journeys made by the vehicle; and determining the required state of charge in dependence on the predicted reduction in state of charge.

In some embodiments the method comprises postponing by a delay period said transfer of data; and the duration of the delay period is dependent on the state of charge required at the end of the period.

In some embodiments the estimated charge required to perform the required transfer of data is determined based on known power consumption of one or more electronic units required to be active during the transfer to be performed.

According to another aspect of the invention there is provided a computer program which when executed on a processor causes the processor to perform the method of any one of the previous paragraphs.

According to another aspect of the invention there is provided computer-readable storage medium having instructions stored therein which when executed on a processor cause the processor to perform the method of any one of the previous paragraphs.

Optionally, the computer-readable storage medium comprises a non-transitory computer-readable storage medium.

According to yet another aspect of the invention there is provided an apparatus for controlling a transfer of data, the apparatus comprising a control means configured to: determine a predicted duration of a period in which recharging of an energy storage means of a vehicle by an external charging means is performable; determine a state of charge of the energy storage means that is required at the end of the period; obtain an estimate of charge required to perform a transfer of data; and enable the transfer of data to be performed in dependence on the transfer of data not preventing the energy storage means having the required state of charge at the end of the period.

According to a further aspect of the invention there is provided an apparatus for controlling a transfer of data to and/or from a vehicle, the apparatus comprising at least one electronic processor and at least one electronic memory device coupled to the electronic processor and having instructions stored therein which when executed by the processor configure the processor to: determine a predicted duration of a period in which charging of an energy storage means of the vehicle by an external charging means is performable; determine a state of charge of the energy storage means that is required at the end of the period;

determine an estimate of charge required to perform a transfer of data; predict a state of charge of the energy storage means at the end of the period if the transfer of data were to be performed; and enable the transfer of data to be performed during the period in dependence on the predicted state of charge of the energy storage means at the end of the period being greater than or equal to the state of charge required at the end of the period.

According to another aspect of the invention there is provided an apparatus for controlling a transfer of data to and/or from a vehicle, the apparatus comprising a control means configured to: determine a predicted duration of a period in which charging of an energy storage means of the vehicle by an external charging means is performable; determine a state of charge of the energy storage means that is required at the end of the period; determine an estimate of charge required to perform a transfer of data; predict a state of charge of the energy storage means at the end of the period if the transfer of data were to be performed; and enable the transfer of data to be performed during the period in dependence on the predicted state of charge of the energy storage means at the end of the period being greater than or equal to the state of charge required at the end of the period.

According to further aspect of the invention there is provided a method of transferring data, the method comprising: determining a predicted duration of a period in which charging of an energy storage means of the vehicle by an external charging means is performable; determining a state of charge of the energy storage means that is required at the end of the period; determining an estimate of charge required to perform a transfer of data; predicting a state of charge of the energy storage means at the end of the period if the transfer of data were to be performed; and enabling the transfer of data to be performed during the period in dependence on the predicted state of charge of the energy storage means at the end of the period being greater than or equal to the state of charge required at the end of the period.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
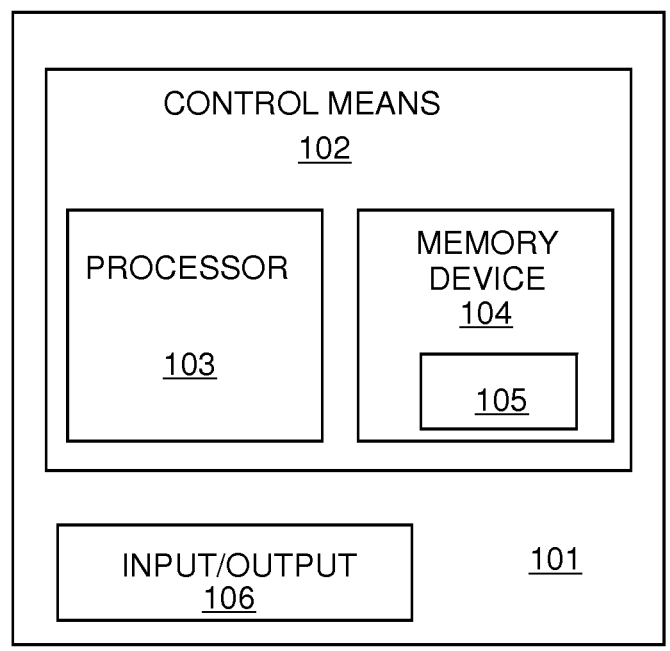
FIG. 1 shows a schematic diagram of an embodiment of an apparatus according the present invention for controlling a transfer of data to and/or from a vehicle.
Figure 1:
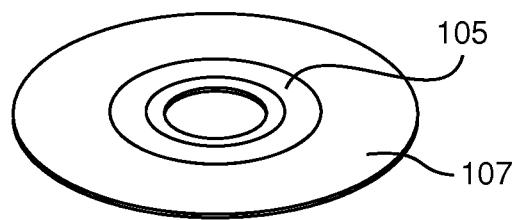
Figure 2:
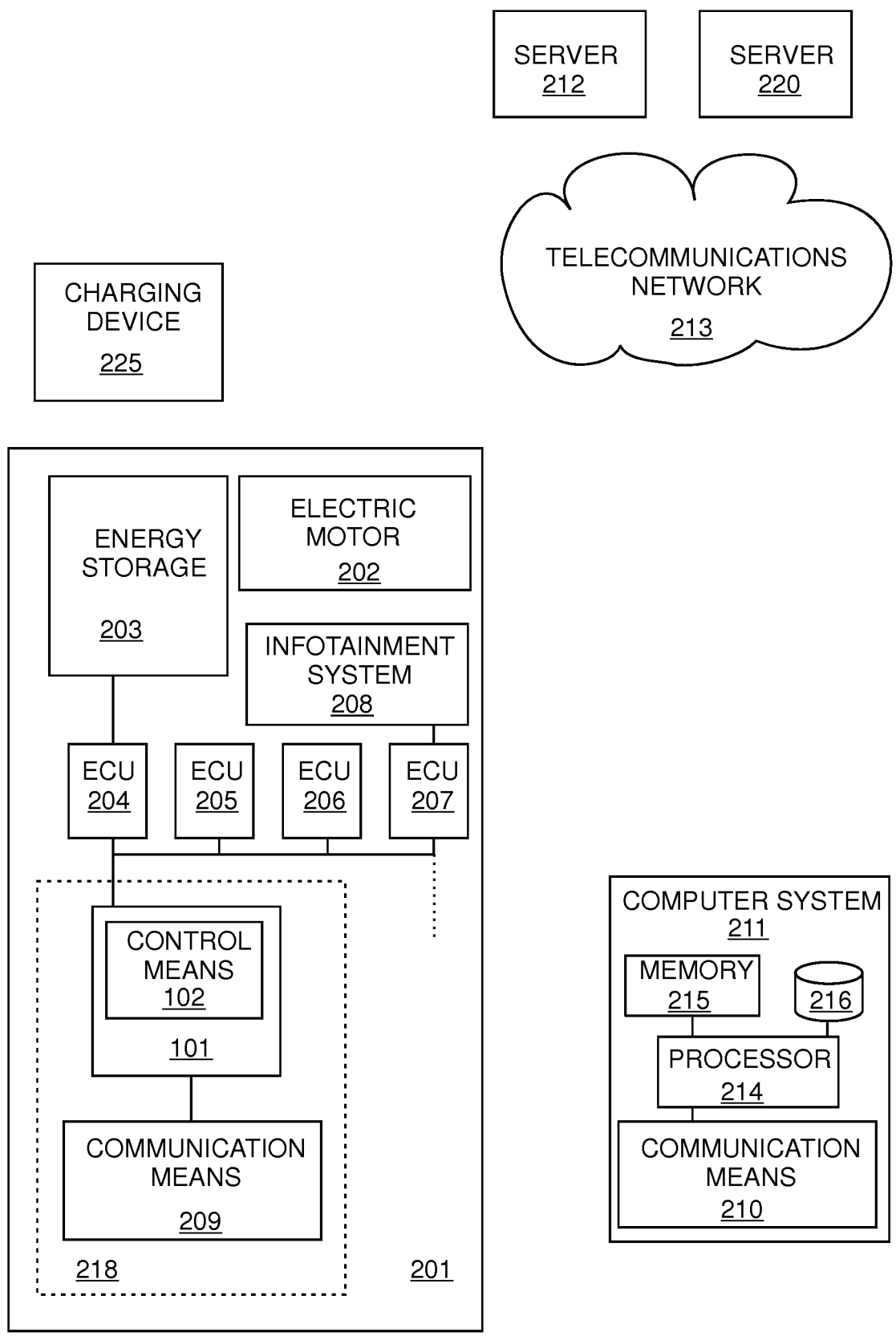
FIG. 2 shows a schematic diagram of an embodiment of an apparatus according to the present invention located within a vehicle.

FIGS. 1 and 2 illustrate an apparatus 101 for controlling transfer of data to and/or from a vehicle 201, the apparatus 101 comprising a control means 102 configured to: determine a state of charge of the energy storage means 203 that is required at the end of a period in which charging of the energy storage means 203 by an external charging means 225 is performable; predict a state of charge of the energy storage means 203 at the end of the period if the transfer of data were to be performed; and enable the transfer of data to be performed during the period in dependence on the predicted state of charge of the energy storage means 203 at the end of the period being greater than or equal to the state of charge required at the end of the period.

In some of the embodiments, the control means 102 is configured to: determine an estimate of charge required to perform a transfer of data; and determine the predicted state of charge in dependence on the estimate of charge required to perform a transfer of data. The control means 102 may also be configured to determine a predicted duration of the period in which charging of an energy storage means 203 of the vehicle 201 by an external charging means 225 is performable.

An example of an apparatus 101 for controlling a transfer of data to and/or from a vehicle is shown schematically in FIG. 1. The apparatus 101 comprises control means 102 comprising an electronic processor 103 and an electronic memory device 104. A computer program 105 comprising instructions is stored in the memory device 104 and the processor 103 is configured to execute the instructions and perform a method of transferring data as will be described below.

The apparatus 101 also comprises input/output means 106 for receiving and transmitting communications to other electronic devices. The input/output means 106 may comprise a transceiver for communicating with other devices over a data bus, such as a controller area network bus (CAN bus) of a vehicle. In addition, the input/output means 106 may comprise a transceiver for communicating with other devices wirelessly.

The computer program 105 may be transferred to the memory device 104 via a non-transitory computer readable medium, such as a CD-ROM 107 or a portable memory device, or via a network, such as a wireless network.

In FIG. 1 a single processor 103 and single memory device 104 are shown, but it will be understood that the control means 102 of apparatus 101 may comprise several processors 103 and/or several memory devices 104.

A schematic diagram of the apparatus 101 located within a vehicle 201 is shown in FIG. 2. The vehicle 201 in the present example is an electrically powered vehicle. The vehicle 201 has an electric motor 202 that is provided with electrical energy stored in an energy storage means 203 comprising at least one battery, or at least one capacitor, or a combination of at least one battery and at least one capacitor. In alternative embodiments the vehicle 201 may be a hybrid vehicle that is partially electrically powered and partially powered by an internal combustion engine. The vehicle 201 also comprises an electronic control unit (ECU) 204 for controlling recharging of the energy storage means 203 when connected to an external charging device, such as charging device 225.

The vehicle 201 may comprise additional electronic control units (ECUs) configured to control other operations of the vehicle 201. For example, the vehicle 201 may comprise: an ECU 205 for controlling operation of a heating, ventilation and air-conditioning (HVAC) system (not shown); an ECU 206 for controlling operation of a transmission system (not shown); an ECU 207 for controlling operation of an infotainment system 208. Further ECUs for controlling operation of other vehicle systems are envisaged.

The apparatus 101 forms a part of a system 218 comprising a communication means 209, such as a network interface controller to enable the apparatus 101 to transmit and/or receive signals from a communication means 210 of a local computer system 211. In the present embodiment, the communication means 209 and 210 are configured to communicate wirelessly over a wireless local area network (WLAN). In addition, the communication means 209 may comprise a device to enable the apparatus 101 to communicate with a server 212 over a telecommunications network 213, for example via the Internet.

The local computer system 211 may comprise one or more processors 214 and memory devices 215 along with one or more storage devices 216 which may be used to temporarily store files that are awaiting download to the vehicle 201. These files may, for example, comprise software updates received from the server 212 for the various ECUs 204, 205, 206, 207, etc. of the vehicle 201 or may comprise media files (comprising music, videos, etc.) for the infotainment system 208.

In the present embodiment, the apparatus 101 comprises the control means 102 configured to control transfer of data between the local computer system 211 and the apparatus 101. However, it will be appreciated that the control means 102 may be provided by the local computer system 211. In this case, the local computer system 211 is arranged to control transfer of data to the apparatus 101 in dependence on information provided to it relating to the journeys made by the vehicle 201. The information relating to the journeys made by the vehicle 201 may be provided to the local computer system 211 by the apparatus 101 or by a remote server, such as server 220, that stores information received from the apparatus 101. In the latter case, the remote server 220 may receive the information directly from the vehicle 201 via the telecommunications network 213 or via a computer system, such as the computer system 211.

In the present embodiment, the control means 102 of apparatus 101 is configured to determine whether to enable a transfer of data whenever the vehicle 201 is powered down at the end of a journey to begin a period in which charging of the energy storage means 203 by an external charging means 225 is performable. The transfer of data may comprise downloading data files that are awaiting download from the local computer system 211 to the apparatus 101. Such data files may comprise software updates for the apparatus 101 or one or more of the other ECUs 205, 206, 207, etc., or may comprise media files for the infotainment system 208. Additionally or alternatively, the transfer of data files may comprise uploading data files, such as video data recorded by a camera or other imaging means (not shown) that is located on or within the vehicle 201.

In order to enable the control means 102 to determine what data to transfer during a period in which charging of the energy storage means 203 by the external charging means 225 is performable, it may first obtain information providing details of the data that is awaiting transfer from the computer system 211. Thus, the control means 102 may be configured to request such information from the computer system 211 when such a period begins or alternatively the computer system 211 may be configured to send the information upon receipt of a notification indicating that the apparatus 101 has joined a network that includes the computer system 211. The information obtained by the control means 102 may comprise metadata indicating: the size of one or more files containing the data; and/or which of the ECUs of the vehicle are required to be awake during the transfer and/or during installation of transferred software; and/or priority ratings indicative of an urgency of the transfer of each individual file.

Before deciding whether to transfer data, the apparatus 101 firstly determines whether a transfer of data is likely to have a sufficient impact on the charge stored in the energy storage device 203 so as to adversely affect the ability of the vehicle 201 to complete its next journey. For example, it may make its determination in dependence on a number of different variables such as: a current state of charge of the energy storage means 203; whether charging of the energy storage means will be performed (or be performable) before the next journey; what energy is required to transfer each data file or set of data awaiting transfer; an estimate of the time available to perform the data transfer; and an estimate of the energy required for the next journey.

Figure 3:
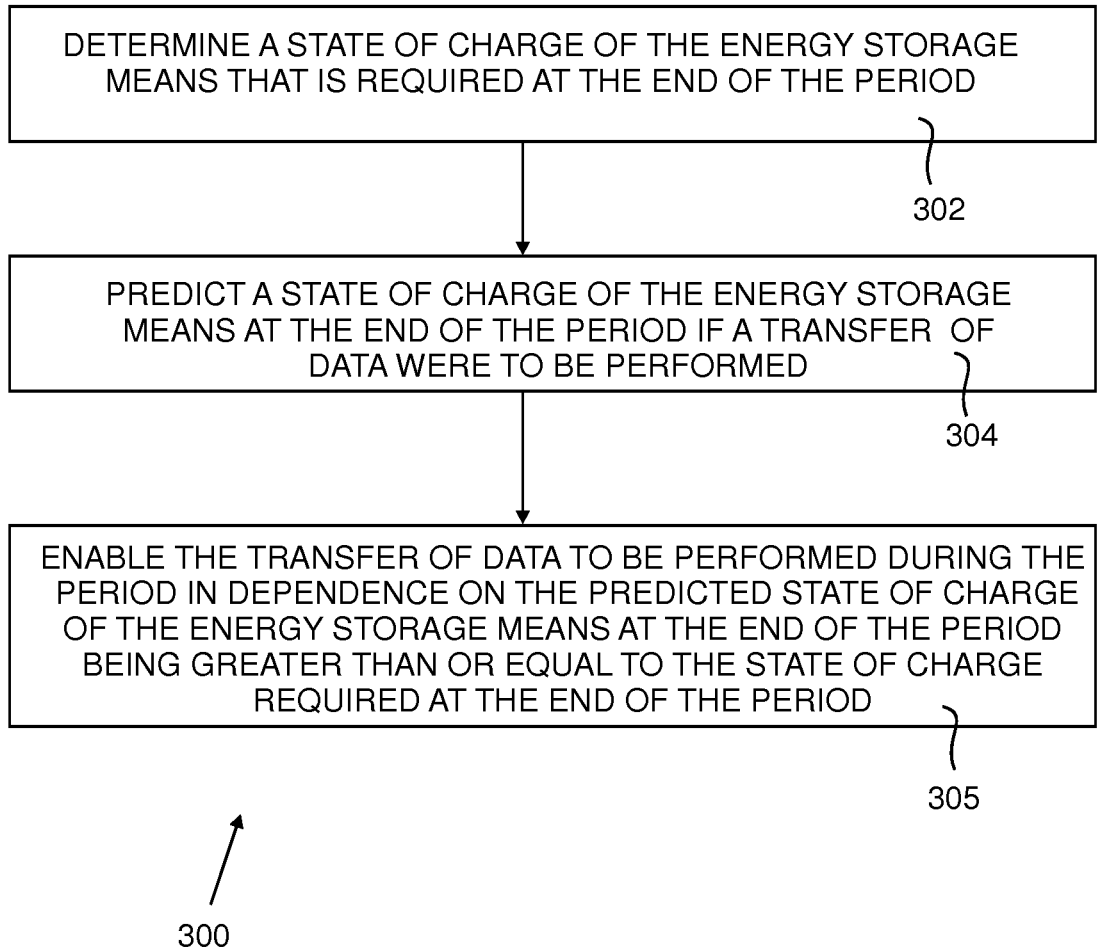
FIG. 3 shows a flowchart of a method according to the present invention for controlling a transfer of data to and/or from a vehicle.

A method 300, which may be performed by the control means 102, is outlined in the flowchart of FIG. 3. Firstly, at block 302 of the method 300, the state of charge of the energy storage means 203 that is required at the end of a period, in which charging of the energy storage device by the external charging means 225 is performable, is determined. This determination may be done by analysing data previously logged by the apparatus 101. The data may relate to energy usage during journeys previously made by the vehicle 201 or distances of previously made journeys and power consumption of the vehicle 201. This logged data may be analysed in consideration of the days of the week and the time of the day of the previous journeys and the day of the week and the time of the predicted next journey. For example, logged data may show that a journey of a relatively long distance near to the maximum range of the vehicle (with the energy storage means 203 fully charged) is regularly undertaken on Thursdays, and journeys of less than half that distance are performed on other days of the week. Thus, the control means 102 may determine that a full charge of the energy storage means 203 is required at the end of the period before the predicted journey on a Thursday, but only a fraction of that charge is required before the predicted journeys of other days.

In instances where the control means 102 has access to one or more calendars belonging to one or more users of the vehicle 201, the control means 102 may determine the required state of charge at block 302 from information relating to upcoming appointments. For example, where a calendar indicates that an appointment at a location is scheduled for the next day, and the control means 102 has logged information available relating to one or more journeys to that location, it may determine the required state of charge at block 302 from the logged information for the one or more previous journeys to that location. Alternatively, the control means 102 may have access to a navigation module capable of providing an estimated distance to the location of the appointment, and, from that estimated distance and known power consumption of the vehicle 201, the control means 102 is able to determine an estimate of charge required for the journey.

In instances where no information, or insufficient information, is available from a calendar or logged data for previous journeys, the control means 102 may be arranged to determine that the energy storage means 203 is required to be fully charged.

At block 304, a prediction is made of a state of charge of the energy storage means 203 at the end of the period in which charging of the energy storage means by an external charging means 225 is performable, if the transfer of data were to be performed. This may be achieved by firstly obtaining a measurement of the present state of charge of the energy storage means 203 from the ECU 204 that controls charging of the energy storage means 203 and determining an estimate of charge required to perform a transfer of data, as will be further described below with regard to block 403 of FIG. 4. The estimated charge required to perform the transfer of data may then be subtracted from the present state of charge to predict the state of charge at the end of the period.

In some embodiments, recharging of the energy storage means 203 may not be performed during the period when charging of the energy storage means by an external charging means 225 is performable. For example, when the energy storage means 203 is already fully charged or charged sufficiently for the next journey. However, typically, the control means 102 will also determine an increase in charge obtainable by charging during the period and add this to the present state of charge and subtract the estimated charge required to perform data transfer in order to determine the predicted state of charge at the end of the period.

In instances where the energy storage means is being charged by an external charging means 225 and a received signal (for example from the ECU 204) indicates that the current state of charge is greater than or equal to the state of charge required at the end of the period, the control means 102 may simply predict, at block 304, that the state of charge of the energy storage means 203 at the end of the period will be greater than or equal to the state of charge of the energy storage means required at the end of the period. This is because it may be assumed that the rate of charging is likely to be greater than or equal to the rate of reduction in charge due to the transfer of data. In some embodiments, the apparatus 101 may provide an indication to the ECU 204 of the required state of charge of the energy storage means that is determined at block 302, and the ECU 204 then provides a signal to the apparatus 101 when the current state of charge is greater than or equal to the state of charge that is required at the end of the period. From this signal the control means 102 predicts, at block 304, that the state of charge of the energy storage means 203 at the end of the period will be greater than or equal to the current state of charge of the energy storage means, or greater than or equal to the state of charge required at the end of the period.

At block 305, the method 300 enables the transfer of data to be performed during the period in dependence on the predicted state of charge of the energy storage means at the end of the period being greater than or equal to the state of charge required at the end of the period.

In some embodiments, if at block 305 it is determined that the predicted state of charge of the energy storage means 203 at the end of the period (as determined at block 304) is less than the state of charge required at the end of the period (as determined at block 302) then no transfer of data is enabled/ performed. That is, the transfer of data is only allowed to be performed in dependence on the transfer of all data awaiting transfer not preventing the energy storage means from having the required state of charge at the end of the period. However, in some other embodiments, if the transfer of all of the data awaiting transfer would result in the predicted state of charge at the end of the period being less than the determined state of charge required at the end of the period, the method enables a transfer of a portion of the data awaiting transfer. Such an arrangement will be described in further detail below with reference to FIG. 5.

Figure 4:
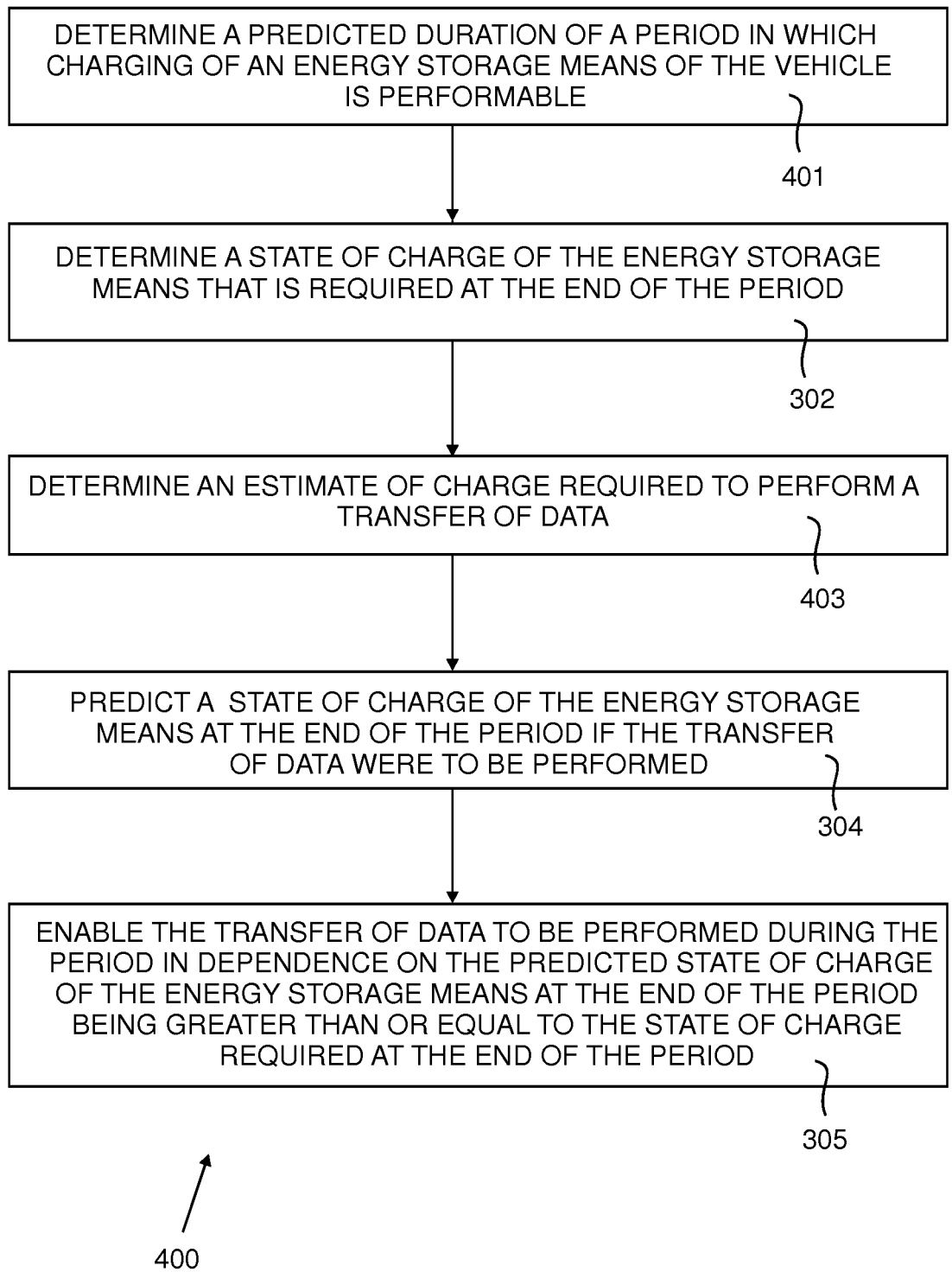
FIG. 4 shows a flowchart of a method according to the present invention which illustrates an example of the method of FIG. 3.

A flowchart outlining an embodiment of a method 400 according to the invention is shown in FIG. 4. The method 400 may be performable by the control means 102.

Firstly, at block 401 the method comprises determining a predicted duration of a period in which charging of the energy storage means 203 of the vehicle 201 by the external charging means 225 is performable. The determination at block 401 may comprise an analysis of data previously logged by the apparatus 101, in which the data comprises departure times of journeys previously made by the vehicle 201. For example, the logged data may show that after completing journeys after a particular time in the evening, the vehicle 201 is generally next used only after a particular time the next morning.

The apparatus 101 may also distinguish days of the week during the analysis and therefore perform the analysis in consideration of: the days of the week and the time of the day of the previous journeys; and the day of the week and the time of the predicted next journey. For example, at block 401, in dependence on logged data, the apparatus 101 may predict an early start time (for example 7.30 am) for a next journey when the next day is a weekday and a later start time (for example 9.40 am) for a next journey when the next day is at the weekend.

The predicted duration may be determined to be the whole period between the current time and the predicted time of the next journey, or may be, for example, only a portion of the whole period, where low cost energy is only available for charging the vehicle during that portion of time.

Additionally or alternatively, the control means 102 may have access to one or more calendars belonging to the one or more users of the vehicle 201. In this case, the control means 102 may determine the predicted departure time for the next journey in dependence on the next appointment in the calendar, particularly when the next appointment indicates that an earlier departure time than is usual is likely.

At block 302 of the method 400, a state of charge of the energy storage means that is required at the end of the period is determined. The process at block 302 of the method 400 is the same as the process at block 302 of the method 300 described above.

At block 403 an estimate of charge required to perform a transfer of data is determined.

Metadata provided by the computer system 211, which describes the data awaiting transfer, may indicate the amount of data to be transferred in total, or the amount of data in each data file or set of data awaiting transfer. Alternatively, where the data awaiting transfer relates to software updates requiring operation of various systems of the vehicle 201, such as ECUs 204, 205, 206, 207 and infotainment system 208 to be awake during a transfer, the metadata may provide a previously determined estimate of the charge (or energy) required for the transfer. Thus, the determination at block 403 may comprise: obtaining the estimated charge requirement from the computer system 211; adding together estimated charge requirements provided by the computer system 211; calculating the charge required from the amount of data requiring transfer, and a rate of data transfer and/or known power consumption of one or more electronic units required to be active during the transfer; or a combination of these processes. The rate of data transfer may be predicted from rates of transfer of previous transfers of data, or may be predicted in dependence on known power consumption of the hardware to be used for the transfer.

At block 304 of method 400, a state of charge of the energy storage means 203 at the end of the period, if the transfer of data were to be performed, is predicted. The process at block 304 of method 400 may be the same as the process at block 304 of method 300 described above. However, in the method 400 the state of charge predicted at block 304 is determined in dependence on the estimate of charge required to perform the transfer of data that was determined at block 403.

At block 305, the method 400 enables the transfer of data to be performed during the period in dependence on the predicted state of charge of the energy storage means at the end of the period (as determined at block 304) being greater than or equal to the state of charge required at the end of the period (as determined at block 302). Therefore, the process at block 305 may be the same as the process at block 305 of method 300 described above.

Figure 5:
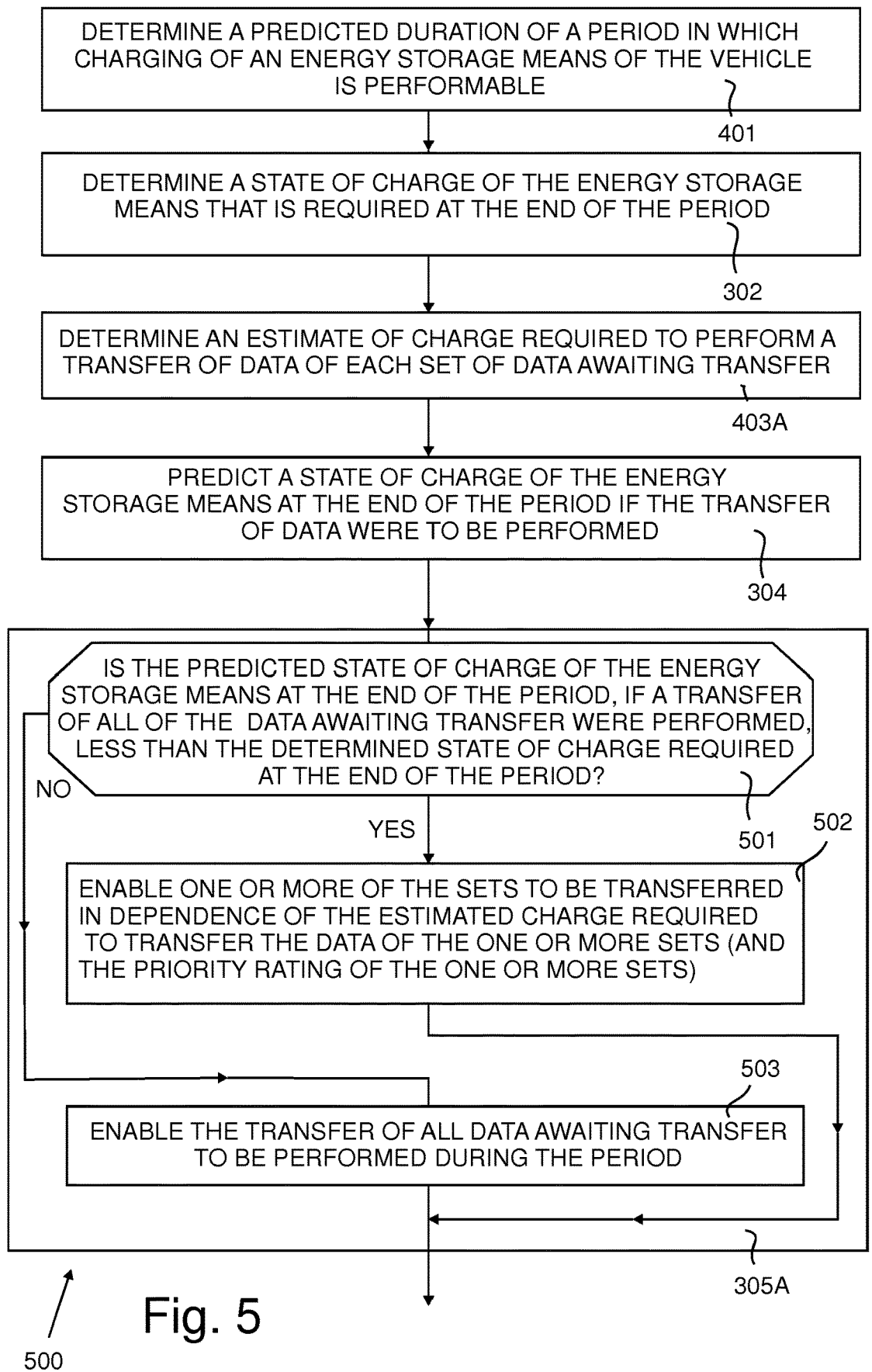
FIG. 5 shows a flowchart of a method according to the present invention which illustrates examples of the methods of FIGS. 3 and 4.

A flowchart outlining an embodiment of a method 500 in accordance with the invention is shown in FIG. 5. The method 500 is performable by the control means 102. In the method 500, at block 401, a predicted duration of a period in which charging of the energy storage means 203 of the vehicle 201 by the external charging means 225 is performable is determined, and at block 302 a state of charge of the energy storage means that is required at the end of the period is determined. Thus, blocks 401 and 302 of method 500 are the same as blocks 401 and 302 of method 400 described above.

At block 403A of method 500, an estimate of charge required to perform a transfer of data of each set of data awaiting transfer is determined. Each set of data may comprise one or more data files or may comprise a portion of one larger data file to enable it to be transferred in parts. The estimates of charge required may be determined as described above with regard to block 403.

At block 304 of method 500, a prediction is made of the state of charge of the energy storage means at the end of the period, if a transfer of all of the data were to be performed, and so block 304 of method 500 may be the same as block 304 of method 300 and 400.

At block 305A of method 500, transfer of data is enabled during the period in dependence on the predicted state of charge of the energy storage means at the end of the period being greater than or equal to the state of charge required at the end of the period. The transfer enabled at block 305A may be a transfer of only a portion of data awaiting transfer, but like methods 300 and 400, the transfer of data that is allowed to be performed at block 305A depends on the transfer of data not preventing the energy storage means from having the required state of charge at the end of the period.

In the present example, within block 305A at block 501, it is determined whether the predicted state of charge of the energy storage means at the end of the period, if a transfer of all of the data awaiting transfer were performed (as determined at block 304), is less than the determined state of charge required at the end of the period (as determined at block 302). If it is not, then block 503 is performed in which the transfer of all data awaiting transfer to be performed during the period is enabled, and block 305A is then complete.

Alternatively, if it is determined at block 501 that the predicted state of charge of the energy storage means at the end of the period, if a transfer of all of the data awaiting transfer were performed, is less than the determined state of charge required at the end of the period, then the process at block 502 is performed. At block 502, the method 500 enables one or more of the sets of data to be transferred in dependence on the estimated charge required to transfer the data of the one or more sets. For example, at block 502 the method 500 may enable as many sets as possible to be transferred provided that the total charge required to perform the transfer of those sets of data does not cause the estimate of the state of charge of the charge storage means at the end of the period to be less than the state of charge required at the end of that period.

In some embodiments, at block 502, the method 500 enables one or more of the sets of data to be transferred in dependence on the estimated charge required to transfer the data of the one or more sets and in dependence on a priority rating of the one or more sets. In such a case, the method prioritizes the data sets to be transferred and attempts to transfer the data sets having the highest priority ratings in preference to those having a lower priority rating. Thus, for example, it may enable as many as possible of the sets of data of the highest priority rating to be transferred, provided that the total charge required for the transfer does not cause the predicted state of charge of the charge storage means at the end of the period to be less than the state of charge required at the end of that period. It may then enable as many as possible of the sets of data of the next highest priority rating to be transferred, provided that the total charge required for the transfer(s) does not cause the predicted state of charge of the charge storage means at the end of the period to be less than the state of charge required at the end of that period.

The priority ratings may be provided within metadata from the computer system 211. For example, where a data set relates to a software update, the software update may be assigned a priority rating when it is produced. Alternatively, the control means may assign priority ratings itself. For example, it may assign a higher priority rating to data files comprising software updates than a priority rating it assigns to media files.

Figure 6:
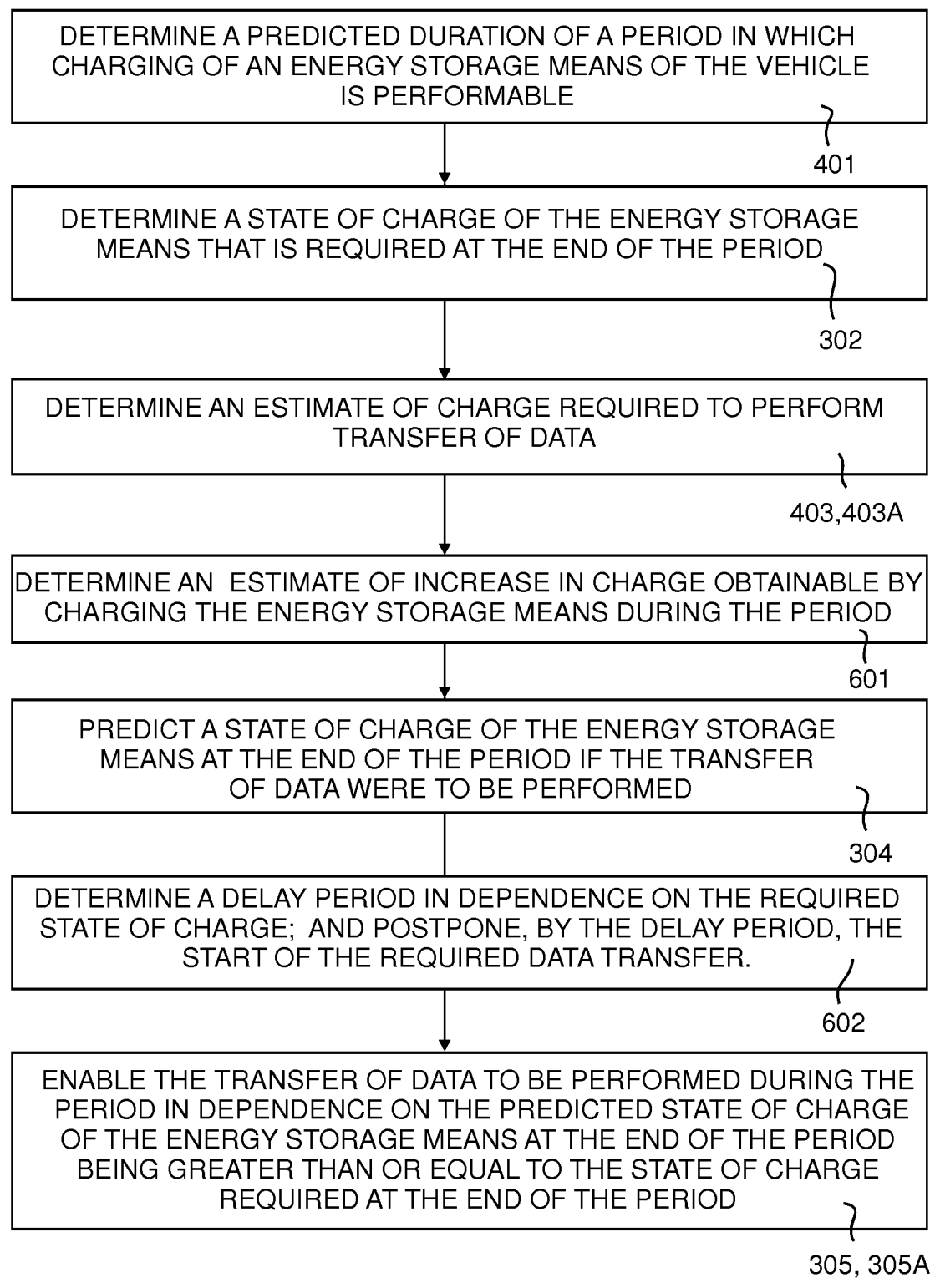
FIG. 6 shows a flowchart of a method according to the present invention which illustrates examples of the methods of FIGS. 3 to 5.

A flowchart outlining an embodiment of a method 600 of controlling transfer of data in accordance with the invention is shown in FIG. 6. The method 600 may be performable by the control means 102. In the method 600, the processes at blocks 401, 302 and 304 are the same as blocks 401, 302 and 304 of method 400. In some examples, the method 600 comprises the block 403 and 305 of method 400, while in other embodiments the method comprises the blocks 403A and 305A of method 500.

The method 600 specifically includes (before the process at block 304) a determination, at block 601, of an estimate of an increase in state of charge by charging the energy storage means during the period in which charging from an external charging means 225 is performable. Thus, the control means 102 may predict at block 304 the state of charge at the end of the period, in dependence on the estimate of increase in charge determined at block 601. The increase in state of charge may be estimated in dependence on the duration determined at block 401 and known rates of charging or the current rate of charging, if charging has already begun.

The method 600 additionally comprises a process at block 602 before the process at block 305 or 305A is performed. At block 602, the method determines a delay period in dependence on the required state of charge at the end of the period and postpones, by the delay period, the start of the required data transfer. Thus, the transfer of data at block 305 or 305A is only performed after the postponement by the delay period.

In some embodiments, the delay period is chosen so that the energy storage means attains the state of charge required at the end of the period in which charging by an external charging means 225 is performable before any transfer of data at block 305 or 305A is allowed. In some embodiments, the delay period is determined by the apparatus 101, which then enters a sleep mode (or low power mode) for a period equal to the delay period. After the delay period, the apparatus 101 enters an operational mode in which it is able to control the transfer of data at block 305 or 305A. After entering the operational mode, the apparatus 101 may receive one or more signals indicative of the state of charge of the energy storage means, for example from the ECU 204, and postpone the start of a required data transfer until a received signal indicates that the state of charge of the energy storage means is greater than or equal to a threshold value. The threshold value may be determined by the control means 102 in dependence on a predicted reduction in the state of charge for a predicted next journey. In the present embodiment, the threshold value is chosen to be a predefined amount more than the predicted reduction in the state of charge for the predicted next journey, to allow for error in the predicted reduction. The predefined amount of charge may be an absolute amount or it may be determined as a percentage of the predicted reduction in charge.

As mentioned above, the predicted duration of the period in which charging of the energy storage means by an external charging means 225 is performable may be determined at block 401 of the methods 400, 500 and 600, from data logged during previous journeys performed by the vehicle. Also, the state of charge of the energy storage means that is required at the end of the period may be determined at block 302 of the methods 300, 400, 500 and 600, from data logged during previous journeys performed by the vehicle.

Figure 7:
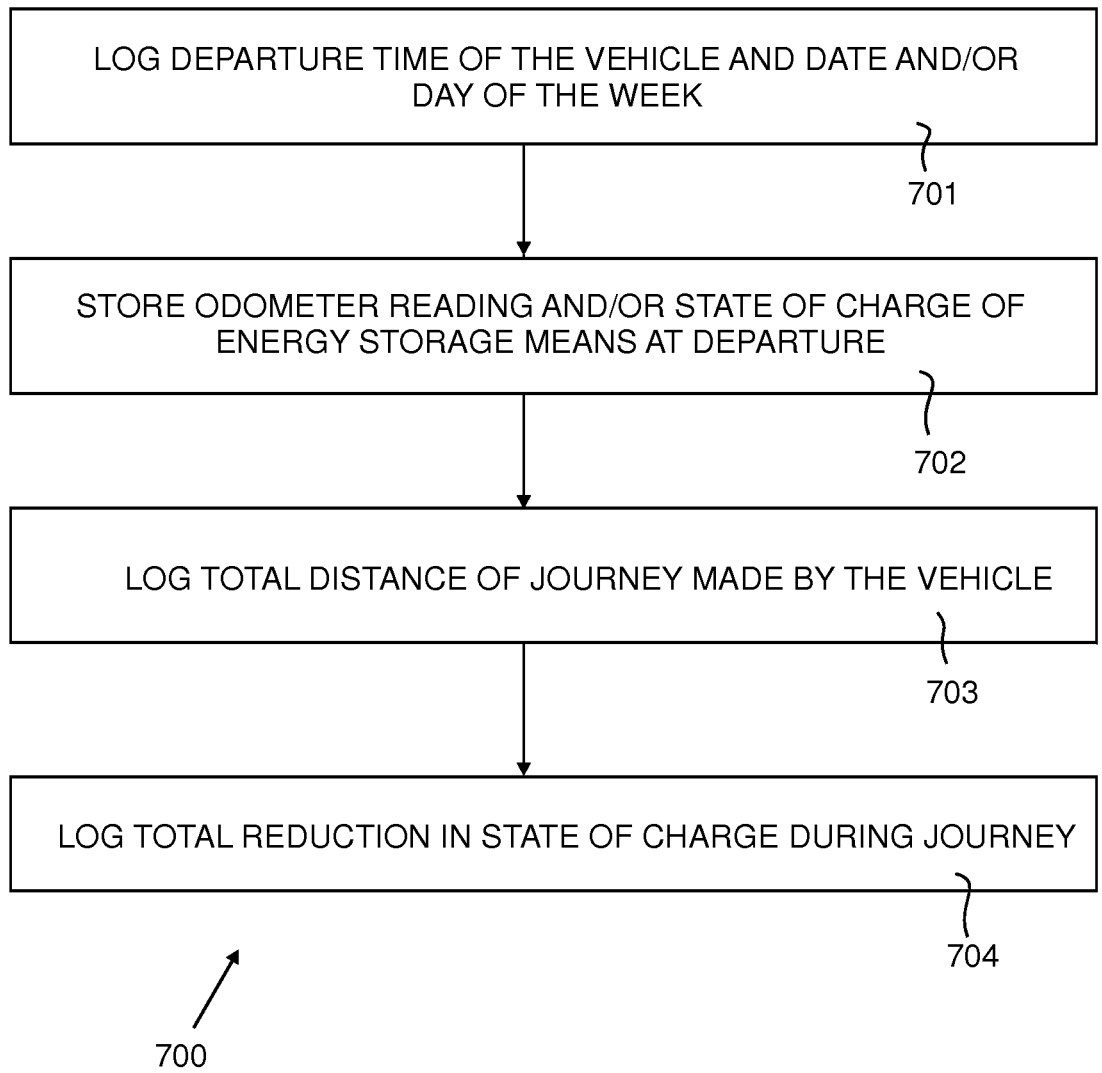
FIG. 7 shows a flowchart of a method according to the present invention.

The method 700, outlined by the flowchart of FIG. 7, illustrates the data logging processes that the apparatus 101 may perform during each of its journeys, to provide the data for the processes of blocks 401 and 302.

At block 701 of method 700, the current time is logged at the start of a journey made by the vehicle 201, along with the date and/or day of the week. For example, the time may be logged whenever the electrical motor consumes energy following a prolonged period of non-use. At the time of departure, an initial odometer reading is stored and/or a state of charge of the energy storage means 203 is stored, as shown at block 702. When the journey is completed the distance travelled during the journey made by the vehicle 201 is determined and logged at block 703 and/or the reduction in state of charge of the energy storage means during the journey is logged at block 704.

For purposes of this disclosure, it is to be understood that the control means described herein can be provided by a control unit or computational device having one or more electronic processors. A vehicle and/or a system thereof may comprise a single control unit or electronic controller or alternatively different functions of the control means may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first control means may be implemented in software run on one or more electronic processors, and one or more other control means may also be implemented in software run on or more electronic processors, optionally the same one or more processors as the first control means. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in the FIGS. 3 to 7 may represent steps in a method and/or sections of code in the computer program 105. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as defined in the claims.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for controlling transfer of data to and from a vehicle, the apparatus comprising a control means configured to:
determine a state of charge of an energy storage means of the vehicle that is required at the end of a period in which charging of the energy storage means by a charging means external to the vehicle is performable;
predict a state of charge of the energy storage means at the end of the period if a transfer of data were to be performed;
enable the transfer of data to be performed during the period based on the predicted state of charge of the energy storage means at the end of the period being greater than or equal to the state of charge required at the end of the period;
determine an estimate of an increase in the state of charge of the energy storage means by charging the energy storage means during the period in which charging from an external charging device means is performable;
receive a signal indicative of the current state of charge of the energy storage means;
determine a delay period in dependence on the estimated increase in the state of charge of the energy storage means by charging; and
postpone, by the delay period, the start of the required data transfer.

2. The apparatus according to claim 1, wherein the control means is further configured to determine an estimate of charge required to perform a transfer of data, and predict the state of charge based on the estimate of charge required to perform a transfer of data.

3. The apparatus according to claim 1, wherein the control means is further configured to enable a transfer of a portion of data awaiting transfer based on a predicted state of charge of the energy storage means at the end of the period, if a transfer of all data awaiting transfer were performed, being less than the determined state of charge required at the end of the period.

4. The apparatus according to claim 1, wherein the control means is further configured to:
control transfer of data that comprises a plurality of sets of data, an estimated charge being associated with each said set for transferring the data of that set; and
cause the required transfer of data to be performed by causing one or more of the sets to be transferred based on the estimated charge required to transfer the data of the one or more sets.

5. The apparatus according to claim 1, wherein the control means is further configured to:
control transfer of data comprising a plurality of sets of data, an estimated charge for transferring the data of a set being associated with each said set, and a priority rating being associated with each said set; and
cause the required transfer of data to be performed by causing one or more of the sets to be transferred based on the estimated charge required to transfer the data of the one or more sets and the priority rating of the one or more sets.

6. The apparatus according to claim 1, wherein the control means is further configured to determine a predicted duration of the period in which charging of an energy storage means of the vehicle by an external charging means is performable.

7. The apparatus according to claim 1, wherein the control means is further configured to:
determine a delay period based on the required state of charge; and
postpone, by the delay period, the start of the required data transfer.

8. The apparatus according to claim 1, wherein the control means is further configured to determine the estimated charge required to perform the transfer of data based on either or both the quantity of data to be transferred and a rate of data transfer.

9. The apparatus according to claim 1, wherein the control means is further configured to determine the estimated charge required to perform the transfer of data based on a known power consumption of one or more electronic units required to be active during the transfer.

10. The apparatus according to claim 1, wherein the predicted state of charge of the energy storage means at the end of the period is based on an estimate of increase in charge by charging the energy storage means during the period.

11. The apparatus according to claim 1, wherein the control means comprises at least one electronic processor and at least one electronic memory device coupled to the electronic processor and having instructions stored therein.

12. A system comprising the apparatus of claim 1 and a communication means for transmitting and receiving a signal comprising the data.

13. A vehicle comprising the apparatus of claim 1.

14. A vehicle comprising the system of claim 12.

15. A method of transferring data, the method comprising:
determining a state of charge of an energy storage means of a vehicle that is required at the end of a period in which charging of the energy storage means by a charging means external to the vehicle is performable;
predicting a state of charge of the energy storage means at the end of the period if a transfer of data were to be performed;
enabling the transfer of data to be performed during the period based on the predicted state of charge of the energy storage means at the end of the period being greater than or equal to the state of charge required at the end of the period;
determining an estimate of an increase in the state of charge of the energy storage means by charging the energy storage means during the period in which charging from an external charging device means is performable;
receiving a signal indicative of the current state of charge of the energy storage means;
determining a delay period in dependence on the estimated increase in the state of charge of the energy storage means by charging; and
postponing, by the delay period, the start of the required data transfer until.

16. The method according to claim 15, comprising determining an estimate of charge required to perform the transfer of data; and predicting the state of charge at the end of the period in dependence on the estimate of charge required to perform the transfer of data.

17. The method according to claim 15, wherein data required to be transferred comprises a plurality of sets of data, an estimated charge being associated with each said set for transferring the data of that set, and said enabling the required transfer of data to be performed comprises causing one or more of the sets to be transferred based on the estimated charge required to transfer the data of the one or more sets.

18. The method according to claim 15, further comprising determining a predicted duration of the period in which charging of an energy storage means of the vehicle by an external charging means is performable, wherein the predicted state of charge of the energy storage means at the end of the period is based on an estimate of increase in charge by charging the energy storage means during the period.

19. A computer program which when executed on a processor causes the processor to perform the method of claim 15.

20. A non-transitory computer-readable storage medium having instructions stored therein which when executed on a processor cause the processor to perform the method of claim 15.

* * * * *